(12) United States Patent
Tamai (10) Patent No.: US 8,286,330 B2
(45) Date of Patent: Oct. 16, 2012

(54) METHOD OF PRODUCING A VIBRATING BODY FOR A VIBRATION WAVE DRIVE DEVICE

(75) Inventor: Jun Tamai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/772,444

(22) Filed: May 3, 2010

(65) Prior Publication Data

US 2010/0283356 A1    Nov. 11, 2010

(30) Foreign Application Priority Data

May 8, 2009   (JP) .................. 2009-113922

(51) Int. Cl.
*H04R 1/02* (2006.01)
*H04R 17/10* (2006.01)

(52) U.S. Cl. .......... 29/594; 29/25.35; 310/312; 310/369

(58) Field of Classification Search .............. 29/594, 29/25.35, 596; 310/312, 348, 369, 328; 347/68, 347/69

See application file for complete search history.

(56) References Cited

U.S. PATENT DOCUMENTS

| | | | | |
|---|---|---|---|---|
| 5,262,696 | A | * | 11/1993 | Culp .................. 310/328 |
| 5,363,006 | A | | 11/1994 | Yano et al. |
| 5,432,540 | A | * | 7/1995 | Hiraishi ............... 347/69 |
| 5,472,662 | A | | 12/1995 | Yano et al. |
| 5,631,680 | A | * | 5/1997 | Sugahara ............. 347/69 |
| 5,760,529 | A | | 6/1998 | Tamai et al. |
| 5,949,178 | A | | 9/1999 | Tamai et al. |
| 6,107,724 | A | | 8/2000 | Tamai et al. |
| 6,107,725 | A | | 8/2000 | Tamai |
| 6,150,749 | A | | 11/2000 | Tamai et al. |
| 6,337,532 | B1 | * | 1/2002 | Johansson et al. ..... 310/328 X |

FOREIGN PATENT DOCUMENTS

| | | | |
|---|---|---|---|
| JP | 63220782 A | * | 9/1988 |
| JP | 5-344766 A | | 12/1993 |
| JP | 7-135785 A | | 5/1995 |
| JP | 08223947 A | * | 8/1996 |
| JP | 2009-136068 A | | 6/2009 |

* cited by examiner

*Primary Examiner* — A. Dexter Tugbang
(74) *Attorney, Agent, or Firm* — Fitzpatrick, Cella, Harper & Scinto (57) ABSTRACT

Provided is a method of producing a vibrating body for a vibration wave drive device using a vibrator in which an electromechanical energy conversion element is joined to a vibrating body having a plurality of protruding portions, the method including a first step and a second step. In the first step, an elastic material having a plurality of protruding portions is produced. In the second step, a pressure in a direction opposite to a protruding direction of the protruding portions of the elastic material is applied to press at least parts of the protruding portions to reduce slits between the protruding portions adjacent to each other.

3 Claims, 8 Drawing Sheets

METHOD OF PRODUCING A VIBRATING BODY FOR A VIBRATION WAVE DRIVE DEVICE

BACKGROUND OF THE INVENTION

1. Field of the Invention

The present invention relates to a vibrating body having plural protruding portions for a vibration wave drive device, and a method of producing the vibrating body having the plural protruding portions for the vibration wave drive device. The vibration wave drive device includes a vibrator in which an electromechanical energy conversion element is joined to the vibrating body having the plural protruding portions, and a movable body pressure-welded to the protruding portions of the vibrating body. The vibration wave drive device is used as an ultrasonic motor.

2. Related Background Art

There has been known a vibration wave drive device having a vibrator which is formed of a ring-shaped or disc-shaped elastic body, and which has one end surface provided with a large number of pectinate protruding portions, and an opposite surface affixed with a ring-shaped piezoelectric element. In the vibrator of the vibration wave drive device of this type, a large number of slits are radially defined to form the large number of protruding portions. The elastic body in this specification corresponds to an elastic material in the present invention which is a material that has not yet been pressed.

The slits function to increase the vibration displacement of a leading end of each protruding portion. The leading end surface of each protruding portion forms a friction part, and transmits the vibration of the vibrator to the movable body by the aid of a frictional force. That is, traveling-wave vibration is generated in a stator (vibrator) having an electromechanical energy conversion element such as a piezoelectric element fitted to an elastic body made of metal, and a rotor (movable body) pressure-welded to the stator conducts continuous machine motion in one direction. As one method of producing the elastic body of the vibrator described above, Japanese Patent Application Laid-Open No. H07-135785 discloses an example in which the protruding portions are pressed into trapezoidal cross-sectional shapes.

However, in the above-mentioned production method, the leading end of each protruding portion is thinned, and an area of the leading end surface of each protruding portion having the frictional surface against the movable body is liable to be reduced. In another respect, a width of the slits between the adjacent protruding portions in the circumferential direction is liable to be widened. For that reason, because a surface pressure of the frictional surface is increased, the abrasion of the frictional part is liable to increase, and there is room for improvement in the durability of the drive device. On the other hand, even when the protruding portions of the elastic body are produced through a cutting work, the width of the slits between the respective protruding portions in the circumferential direction cannot be too narrowed. This is because when a milling cutter or a grinding tool is thinned for the purpose of thinning the width of the slits in the circumferential direction, the possibility that the milling cutter or the grinding tool is damaged becomes high.

SUMMARY OF THE INVENTION

In view of the above problems, it is an object of the present invention to provide a method of producing a vibrating body, and the vibrating body, which pressurize protruding portions to plastically press at least parts of the protruding portions so as to narrow widths of slits between the protruding portions at the same time. More specifically, according to the present invention, there is provided a method of producing a vibrating body for a vibration wave drive device using a vibrator in which an electromechanical energy conversion element is joined to a vibrating body having a plurality of protruding portions, the method including a first step and a second step. In the first step, an elastic material having a plurality of protruding portions is produced. In the second step, a pressure in a direction opposed (opposite) to a protruding direction of the protruding portions of the elastic material is applied to press at least parts of the protruding portions to reduce slits between the protruding portions adjacent to each other.

Also, according to the present invention, there is provided a vibrating body for a vibration wave drive device using a vibrator in which an electromechanical energy conversion element is joined to a vibrating body having a plurality of protruding portions, the vibrating body including a plurality of protruding portions, in which the protruding portions include side surfaces which form slits between the protruding portions adjacent to each other, the side surfaces including portions nonparallel to each other and projected toward the slits side.

According to the present invention, the width of the slits can be reduced through a simple method in which the protruding portions are plastically pressed under pressure, and hence the vibrating body that can realize the vibration wave drive device high in durability can be produced. That the width of the slits is reduced means that the area of the leading end surface of each protruding portion where the frictional surface is provided can be widened. As a result, the surface pressure of the frictional surface is reduced, and hence the abrasion of the protruding portions can be reduced to enhance the durability. The protruding portions per se made of the elastic material before being pressed can be formed through various methods such as a press work, a forge processing, or a cutting work. In this case, in the cutting work, the width of the slits is not required to be too narrowed (width of the slits during the cutting work may be larger than a design value of a complete body). Therefore, there is no need to thin the thickness of a blade of the milling cutter or the thickness of a grinding stone of the grinding tool so as to conform to the width of the slits of the complete body.

Further features of the present invention will become apparent from the following description of exemplary embodiments with reference to the attached drawings.

DESCRIPTION OF THE EMBODIMENTS

Hereinafter, embodiments of the present invention are described. The importance of a method of producing a vibrating body according to the present invention, in a vibration wave drive device using a vibrator in which an electromechanical energy conversion element is joined to the vibrating body having plural protruding portions, and the vibrating body resides in that at least parts of the protruding portions made of an elastic material are pressed to reduce slits between protruding portions adjacent to each other. Based on this concept, basic features of the method of producing the vibrating body and the vibrating body according to the present invention have the process or the configuration described in the summary of the invention. More specific embodiments described below can be implemented based on the basic features. The term "press" herein employed refers to applying a pressure to a protruding portion to effect plastic deformation, thereby attaining forming into a predetermined shape.

In a second process of the method of producing the vibrating body, it is possible that side surfaces that form parts of protruding portions of an elastic material and do not face slits are held, and a pressure is applied in a direction opposed to a protruding direction of the protruding portions (direction opposite to the protruding direction) to press at least parts of the protruding portions. Third, fourth, and fifth embodiments to be described later are configured in this way. This method can be applied to a second embodiment having a linear shape illustrated in FIG. 2. Similarly, in this case, both side surfaces of the protruding portions which do not face the slits can be held. The term "held" or "hold" in the present invention means that the shape of both side surfaces of the protruding portions which do not face the slits is prevented from being deformed, or the protruding portions are prevented from being deformed in a direction of those surfaces in pressing at least parts of the protruding portions. In the deformation of the shape of both side surfaces of the protruding portions which do not face the slits, or the deformation of the protruding portions in a direction of those surfaces, it is ideal that the side surfaces are held so that the side surfaces are not deformed at all, but the deformation is allowed when the deformation is within an allowable range of design (for example, a dimensionally allowable range, or a range that does not adversely affect other mechanical characteristics). Also, ridge lines of the leading end surface of each protruding portion of the vibrating body, which face the slits, can be of curve lines each having a portion projected toward the slit side. Examples of FIGS. 1B, 3C, and 4B have the above configuration. Also, the side surfaces of the protruding portions, which form the slits, can each include a curve portion. Examples of FIGS. 1B, 3C, 4B, and 7B have the above configuration.

The slits of the protruding portions adjacent to each other can be nonidentical in configuration with each other. An example of FIG. 8B has this configuration. Also, the leading end surface of each protruding portion made of the elastic material can have a surface nonparallel to a plane determined by the leading ends of multiple protruding portions. Examples of FIGS. 6A and 6B have this configuration. The nonparallel surface can be formed by a curved surface. The example of FIG. 6B has this configuration. Further, the protruding portions made of the elastic material can include protruding portions different in height from each other. An example of FIG. 8A has this configuration. The protruding portions of the vibrating body can include protruding portions different in height from each other. The example of FIG. 2A has this configuration. Further, the protruding portions of the vibrating body can include protruding portions different in pressed amount from other protruding portions. Examples of FIGS. 2B and 8B have this configuration. Further, the vibrating body can be annular or disc-shaped, and ridge lines of each protruding portion of the vibrating body, which face the slits, can be inclined from the radial direction. An example of FIG. 5B has this configuration.

As is understood from the above specific embodiments, in the method of producing the vibrating body according to the present invention, various vibrating bodies in which side surfaces of each protruding portion include portions that are nonparallel to each other and projected toward the slit side, and the leading end surfaces of each protruding portion that are widened can be produced by devising how to push or the shape of the protruding portions made of the elastic material. The embodiments of the present invention are described below with reference to the accompanying drawings.

First Embodiment

Figure 1A:
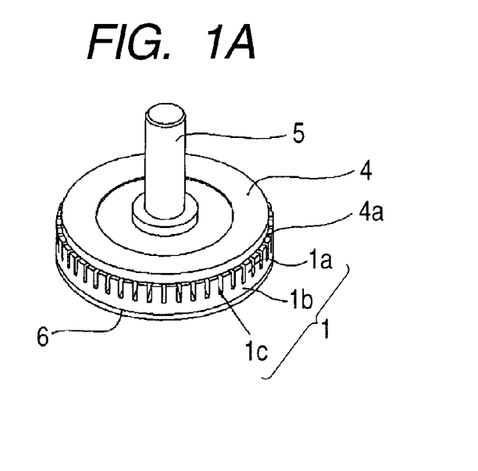
FIG. 1A is a perspective view illustrating a vibration wave drive device.
Figure 1B:
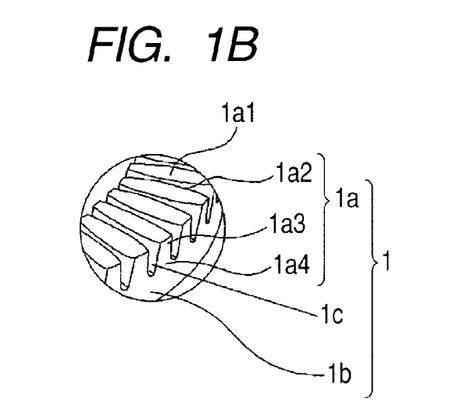
FIG. 1B is a perspective view illustrating a part of a vibrating body produced according to a first embodiment of the present invention.

A vibrating body for a vibration wave drive device and a method of producing the vibrating body according to a first embodiment is described with reference to FIGS. 1A and 1B. FIG. 1A is a perspective view illustrating the vibration wave drive device using the vibrating body according to this embodiment. Slits 1c are drawn with the use of a vibrating body illustrated in FIG. 3C to be described later. However, even when a vibrating body illustrated in FIG. 1B is used, the vibration wave drive device is entirely configured as illustrated in FIG. 1A except that only the shape of the slits 1c is different. In FIG. 1A, a piezoelectric element (electromechanical conversion element) 6 is divided and affixed to a lower surface of a base portion 1b of the vibrating body 1. The vibrator of the vibration wave drive device is thus configured. A frictional part 4a is disposed on an outer peripheral portion of the movable body 4 on the vibrator, and the vibration energy of the vibrator is transmitted to the movable body 4 through the frictional part 4a. An output shaft 5 and the movable body 4 are integrated together, and hence the output shaft 5 rotates together with the movement of the movable body 4.

Figure 1C:
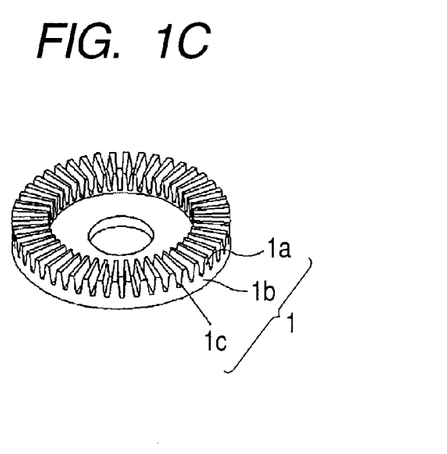
FIG. 1C is a perspective view illustrating an elastic material produced in a forge processing.

In this embodiment, the vibrating body 1 is annular, and the plurality of slits 1c is radially formed in the vibrator. The slits 1c may be formed by the aid of a disc-shaped milling cutter or grinding tool, or may be formed through a press work or a forge processing. In the former, the blank of the vibrator or the tool are radially moved to form the slits, and hence the widths of the slits 1c are held constant, and the ridge lines on the leading end surface of each protruding portion 1a in the radial direction are linear. In this way, when the slits 1c are formed by cutting or grinding, the protruding portion shape and the slit shape of the vibrating body are factually limited. In the related art, such a vibrating body is frequently used as it is. In this embodiment, the vibrating body may be pressed as the elastic material 1 (in the description of the embodiments, the vibrating body that has been pressed and the elastic material before being pressed basically have the same structure, and therefore the elastic material is denoted by reference numeral 1). As a result, the above limit can be reduced. On the other hand, the elastic material 1 produced through the forge processing is illustrated in FIG. 1C. Each protruding portion 1a of the elastic material 1 is trapezoidal in transverse section, and the width of the slit 1c is widened upward. In this embodiment, such an elastic material is subjected to the following processing.

Figure 1D:
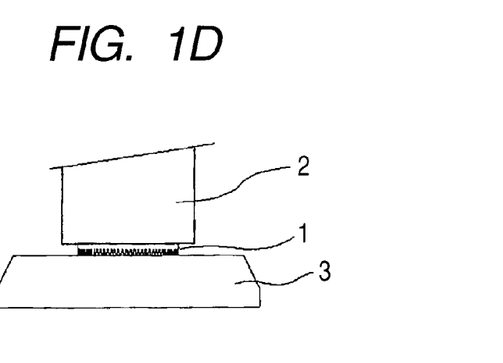
FIG. 1D is a diagram illustrating a production method according to this embodiment.

FIG. 1D illustrates a state in which the elastic material 1 illustrated in FIG. 1C is nipped between a punch 2 and a die 3 each having a plane parallel to each other, and a pressure is applied to the elastic material 1 in a direction opposite to a protruding direction of the protruding portions 1a to press the elastic material 1 through a press machine. As a result of conducting a process of FIG. 1D, the protruding portions 1a of the elastic material 1 illustrated in FIG. 1C, which have been produced through the forge processing, are plastically pressed, and the leading end surfaces 1a1 are widened as illustrated in FIG. 1B. In particular, the central portion of each protruding portion 1a is most widened at the radial position of the protruding portion 1a. That is, a ridge line 1a2 of each protruding portion leading end surface 1a1 substantially in the radial direction is curved in such a manner that the central portion is projected toward the slits 1c side. The leading end surface 1a1 is widened as described above because a frictional force is generated at a portion that contacts a plane (die) and a portion (that is, corner portions of a rectangle if the leading end surface 1a1 is rectangular) positioned away from the center of the leading end surface of each protruding portion (intersecting point between diagonal lines of the rectangle) is difficult to be widened.

In this embodiment, a forged product is used for the elastic material 1, and, for the purpose of easy releasing of the elastic material 1 from the die, the protruding portions 1a are trapezoidal when viewed in the radial direction. That is, the width of an outer peripheral portion 1a3 on the leading end of each protruding portion 1a is narrower than the width of an outer peripheral portion 1a4 on a root portion of the protruding portion 1a. Still, the production method according to this embodiment is implemented to reduce the slits 1c between the adjacent protruding portions 1a, that is, the slit widths in the circumferential direction.

This embodiment obtains the following advantages. First, the area of the leading end surface of each protruding portion which is provided with the frictional surface is widened, and hence a surface pressure of the frictional surface is reduced to enhance the durability. Also, the ridge lines 1a2 of the leading end surface 1a1 of each protruding portion substantially in the radial direction are curved, and hence the ridge lines 1a2 repetitively smoothly come in and out of contact with the frictional surface of the movable body 4. That is, each ridge line 1a2 increasingly comes in contact with the frictional surface of the movable body 4 side from one part thereof. This is because the ridge line 1a2 is not orthogonal to the vibration deforming direction of each protruding portion 1a (flexure in the circumferential direction), and therefore the ridge line increasingly comes in contact with the frictional surface of the movable body 4 side from one part thereof. As a result, in the vibration wave drive device using the vibrating body according to this embodiment, the motion ununiformity (wow flutter) of the movable body 4 can be reduced.

Also, there is no need to form the narrow slits in the circumferential direction by using the milling cutter or the grinding tool, and hence a processing time can be remarkably reduced. Further, as compared with the vibrating body having the same magnification of vibration, the slits are narrowed to increase the mass of the protruding portions, and hence the vibration energy is increased, and a change in the vibration amplitude is reduced with respect to the load fluctuation of the external. This induces a reduction in the travel ununiformity of the movable body 4 in the vibration wave drive device.

Second Embodiment

A second embodiment is described with reference to FIGS. 2A and 2B. In this embodiment, a linear vibrator including a vibrating body 1 and a piezoelectric element 6 linearly drives a movable body 4 of the vibration wave drive device. The movable body 4 is put on the leading end surface of each protruding portion 1a, and the movable body is moved in a longitudinal direction thereof. The vibration wave drive device of this type is different from the above-mentioned annular vibrator in that the leading ends of all the protruding portions 1a do not conduct the same vibrating manner. For that reason, a portion that generates the most effective vibration displacement is used as the frictional part. That is, in this embodiment, as illustrated in FIG. 2A, only leading ends (portions indicated by gray in FIG. 2A) of two protruding portions 1a higher than other protruding portions 1a contact with the surface of the movable body 4.

The elastic material 1 is produced by, for example, cutting a deformed material made by subjecting stainless steel to a drawing process along a direction orthogonal to a longitudinal direction thereof (drawing direction), and forming the protruding portions 1a in the material. For example, a process of pressing the protruding portions 1a of the elastic material 1 is conducted as follows. FIG. 2B illustrates a state in which the elastic material 1 having the same height as that of the protruding portions 1a is used, and the outer side surfaces of the elastic material 1 are held by an outer die 3b, and the protruding portions 1a are pressed between a lower die 3a and a punch 2. In this case, two recesses 3aa are disposed in an upper surface of the lower die 3a so that two protruding portions become higher than other protruding portions after the protruding portions have been pressed. The vibrating body 1 may be fabricated by using the elastic material 1 in which two protruding portions are originally higher than other protruding portions.

Figure 2A:
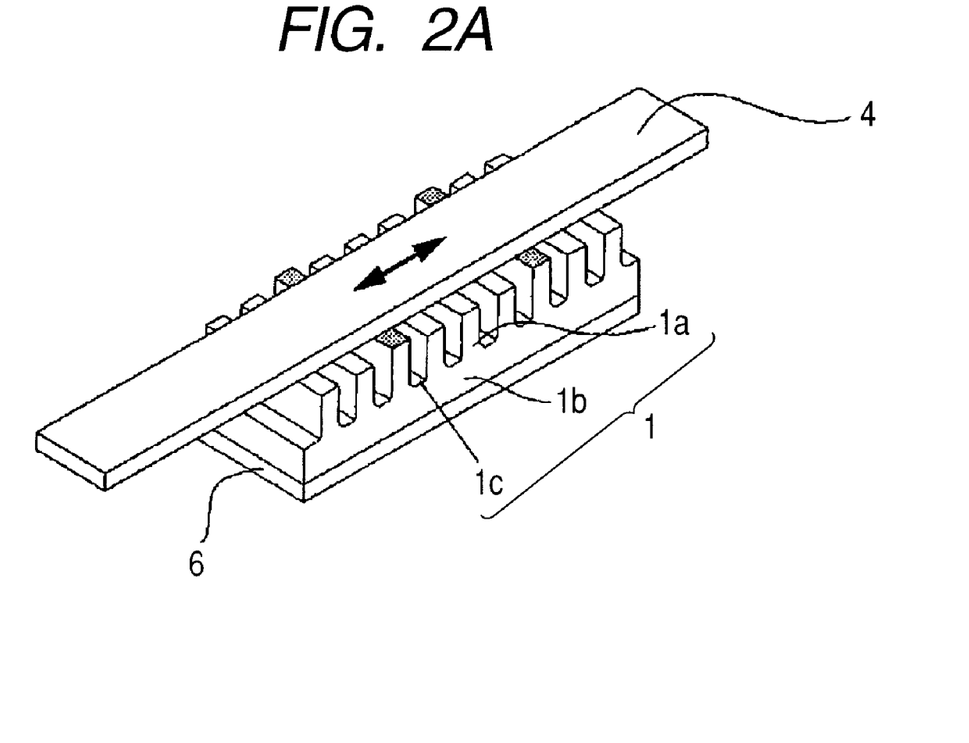
FIG. 2A is a perspective view illustrating a vibration wave drive device of a linearly driving type.
Figure 2B:
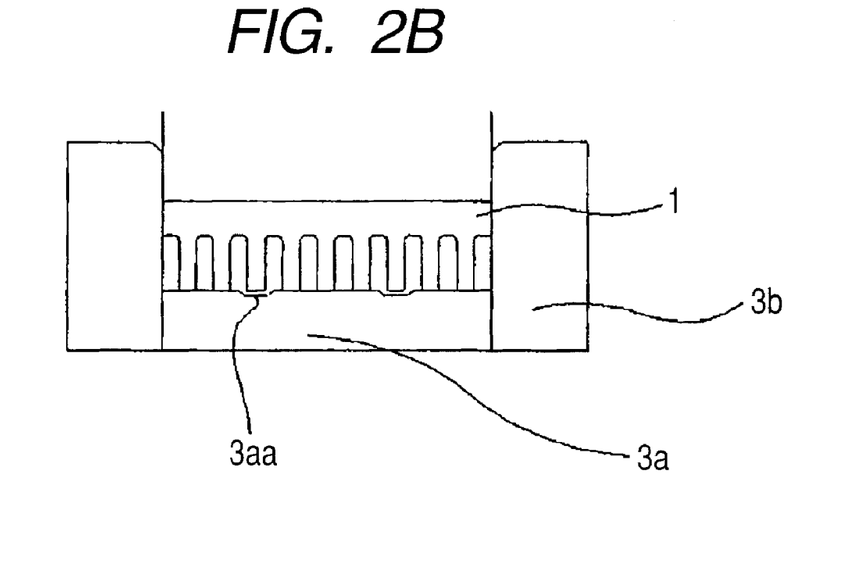
FIG. 2B is a diagram illustrating a production method according to a second embodiment.

In this embodiment, the reason that other protruding portions (seven protruding portions 1a among nine protruding portions 1a in FIGS. 2A and 2B) are provided although those protruding portions do not contact with the movable body 4 is because the following advantages are expected. That is, as compared with a case in which only two protruding portions that contact with the movable body 4 are provided, because the vibration energy is increased, a change in speed of the movable body 4 with respect to the load fluctuation can be reduced. Also, a constant vibration mode (driving vibration mode) corresponding to the number of protruding portions is liable to be vibrated, and the noise generation due to the unnecessary vibration can be reduced.

Also, because the protruding portions become mass in the same space (hence, the mass is increased more as the number of protruding portions is larger), the driving vibration frequency can be reduced. This means that the vibration amplitude can be increased when the input energy is identical). This makes it difficult to be affected by moisture adsorbed on the frictional surfaces of the protruding portions and the plane precision in the frictional surfaces, to thereby improve the quality and performance of the vibration wave drive device. Further, in order to obtain the contact pressure on the frictional surfaces, means for pushing the movable body 4 toward the vibrating body 1 is required. However, when the means is a magnetic force, a large number of protruding portions induce an increase in the magnetic force. Hence, in order to obtain the same pushing force, a smaller magnet may be used.

In this embodiment, through a simple method in which the protruding portions are pressurized and plastically pressed, the leading end surfaces of the protruding portions that contact with the movable body can be enlarged, and hence there can be produced the vibrating body which can realize the vibration wave drive device high in durability.

Third Embodiment

Figure 3A:
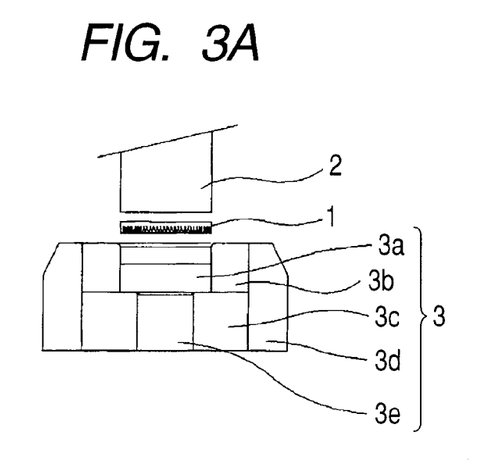
FIG. 3A is a diagram illustrating a production method (prestage) according to a third embodiment.
Figure 3B:
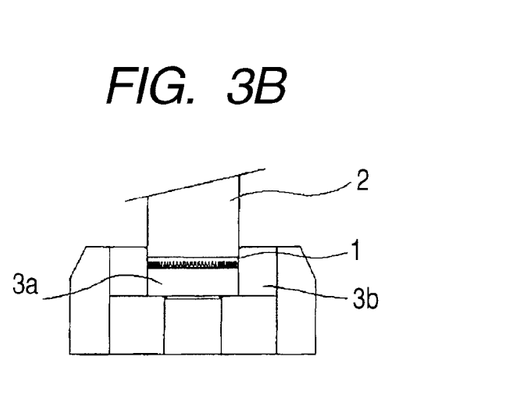
FIG. 3B is a diagram illustrating the production method (during production) according to this embodiment.

FIGS. 3A to 3D are diagrams illustrating a third embodiment of the present invention. FIG. 3A illustrates a state immediately before the elastic material 1 produced through the cutting, grinding, and forge processing is inserted into the die 3 which is mounted to a pressing machine and has the lower die 3a, the outer die 3b, a spacer 3c, a reinforcement ring 3d, and a knockout 3e. FIG. 3B illustrates a state after the elastic material 1 has been inserted into the die 3, and in this state, a process of pressurizing vertically and pressing the elastic material 1 by the punch 2 is executed.

The outer diameter of the elastic material 1 is substantially equal to the inner diameter of the outer die 3b, and hence the outer peripheral surface of the elastic material 1 is held by the outer die 3b. For that reason, the protruding portions 1a are pressed in the vertical direction without expanding the side surfaces of the outer peripheral side of the protruding portions 1a. In this embodiment, the outer peripheral surface of the base portion 1b of the elastic material 1 is also held by the outer die 3b, and hence a diameter of that portion is not increased. However, it is possible that the outer peripheral surface of the base portion 1b of the elastic material 1 is not held, but only the outer peripheral portions of the protruding portions 1a are held.

Figure 3C:
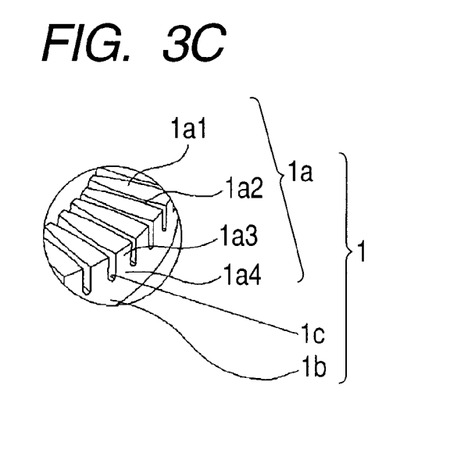
FIG. 3C is a perspective view illustrating a part of a vibrating body produced through the production method according to this embodiment.

A part of the vibrating body 1 produced from the elastic material 1 according to this embodiment is illustrated in FIG. 3C. Unlike the first embodiment, the shape of the leading end surface 1a1 of each protruding portion is expanded in a circumferential direction toward the outer periphery. That is, the slits 1c between the adjacent protruding portions 1a on the outer peripheral side are narrower than those on the inner peripheral side. In this embodiment, the inner periphery of the elastic material 1 is not held, and hence there is a tendency to expand the leading end surfaces 1a1 of the protruding portions in the circumferential direction, and also inward in the radial direction.

In general, when a simple annular member that is rectangular in cross section is pressed by dies having parallel planes, there is a tendency that the material plastically flows in the outer radial direction rather than in the central direction (that is, direction of reducing an inner hole). In this embodiment, it is possible that the plastic flowage is held, to thereby effectively narrow the slit widths in the peripheral direction of the outer peripheral portion. In view of this, in the vibrating body 1 illustrated in FIG. 1B, which is molded by pressing the elastic material 1 without holding the outer peripheral surface thereof, the dimension of the outer peripheral portion in the radial direction on the leading end 1a3 of each protruding portion is larger than the diameter of the base portion 1b.

In the vibrating body of the vibration wave drive device, for the purpose of increasing the torque, a contact position (frictional part) with the movable body 4 is frequently designed to be on the outer peripheral portion. In this embodiment, when the frictional part is located at a desirable position (that is, outer peripheral portion), the surface pressure can be reduced.

Figure 3D:
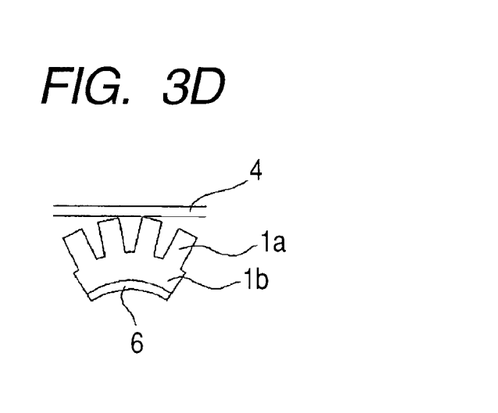
FIG. 3D is a diagram illustrating a state in which each ridge line of protruding portions of the vibrating body contacts with a frictional part of a movable body.

Also, similarly, in this embodiment, each of the ridge lines 1a2 of the leading end surface 1a1 of each protruding portion substantially in the radial direction changes from a straight line to a curve line. Hence, even in the vibration wave drive device using the vibrating body in this embodiment, the ridge lines reduce the motion ununiformity of the movable body. Even when the ridge line is a straight line, the same advantage is obtained when the direction of the ridge line is deviated from the radial direction. FIG. 3D is a diagram illustrating this phenomenon and the advantages. In the case where the ridge lines are orthogonal to the vibration deforming direction (flexure in the peripheral direction) of the protruding portions, when the movable body 4 travels toward the left side, the ridge lines of the leading end surfaces of the protruding portions 1a in the radial direction (direction orthogonal to the traveling direction of the movable body) contact with the frictional part on the movable body side substantially at the same time. On the contrary, when the protruding portions are subjected to the pressing process according to the present invention, the curve ridge lines that are difficult to be realized in other processing methods, or the ridge lines that do not pass through the center of the vibrating body (deviated from the radial direction) can be easily formed. A method of forming the ridge lines that do not pass through the center of the vibrating body is described with reference to fifth and sixth embodiments.

Fourth Embodiment

Figure 4A:
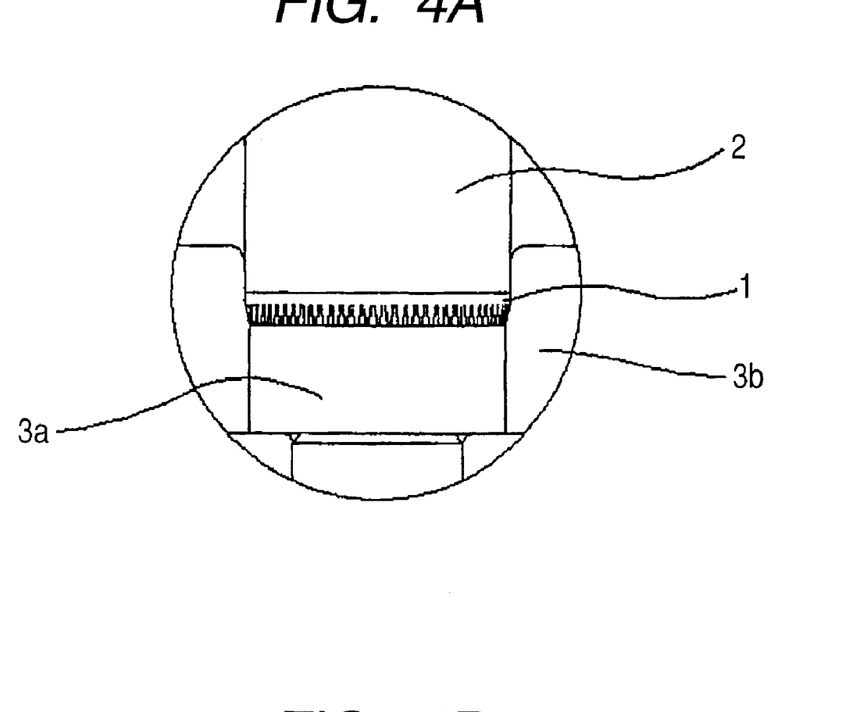
FIG. 4A is a diagram illustrating a production method according to a fourth embodiment.
Figure 4B:
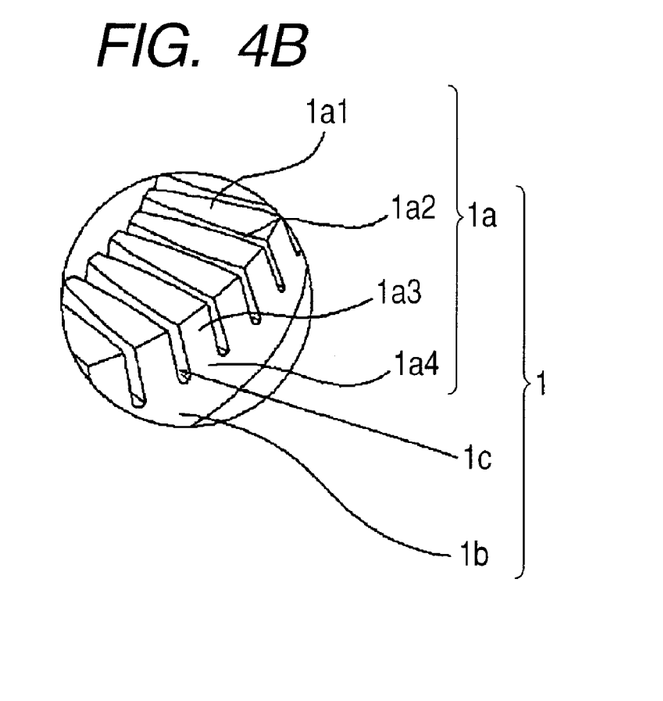
FIG. 4B is a perspective view illustrating a part of the vibrating body produced through the production method according to this embodiment.

A fourth embodiment is described with reference to FIGS. 4A and 4B. FIG. 4B illustrates a part of the vibrating body 1 molded through a production process in this embodiment by using the elastic material. As illustrated in FIG. 4A, in this embodiment, an inner peripheral surface of the outer die 3b is partially tapered, and the tapered portion contacts with the outer peripheral portions of the protruding portions 1a of the elastic material 1, to thereby execute a pressing formation. That is, as is described with reference to symbols in FIG. 4B, in the outer peripheral portions of the protruding portions 1a of the vibrating body, the protruding portions 1a are pressed so that the radial dimension of the outer peripheral portions 1a3 on the leading ends of the protruding portions is smaller than the radial dimension of the outer peripheral portions $1a4$ on the root portions of the protruding portions.

As a result, the protruding portions $1a$ are pressed inward in the radial direction, and also pressed in the vertical direction at the same time. For that reason, the widths of the slits $1c$ in the elastic material 1 in the peripheral direction are remarkably narrowed on the outer peripheral side. In the produced vibrating body 1, the cross section (transverse section) of each protruding portion $1a$ in the peripheral direction is trapezoidal. In this embodiment, the advantages obtained by the above-mentioned third embodiment can be made further remarkable.

Fifth Embodiment

Figure 5A:
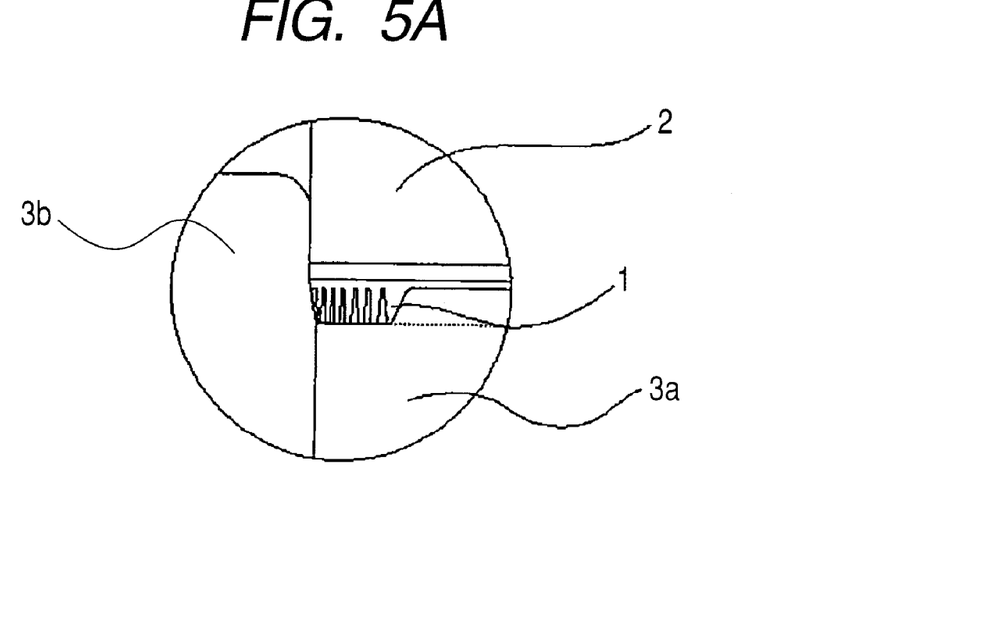
FIG. 5A is a diagram illustrating a production method according to a fifth embodiment.

A fifth embodiment is described with reference to FIGS. 5A and 5B. FIG. 5A illustrates a state of the molding in this embodiment. In this embodiment, an inner diameter portion of the outer die $3b$ is tapered, the lower die $3a$ is stepped, and a side surface of the outer diameter portion of that step is also tapered. For that reason, the vibrating body 1 can be provided with tapered portions in the outer diameter portion as well as in the inner diameter portion. That is, similarly, in the inner peripheral portions of the protruding portions $1a$ of the vibrating body 1, the protruding portions $1a$ are pressed so that the radial dimension of the inner peripheral portions on the leading ends of the protruding portions $1a$ is larger than the radial dimension of the inner peripheral portions on the root portions of the protruding portions $1a$.

Figure 5B:
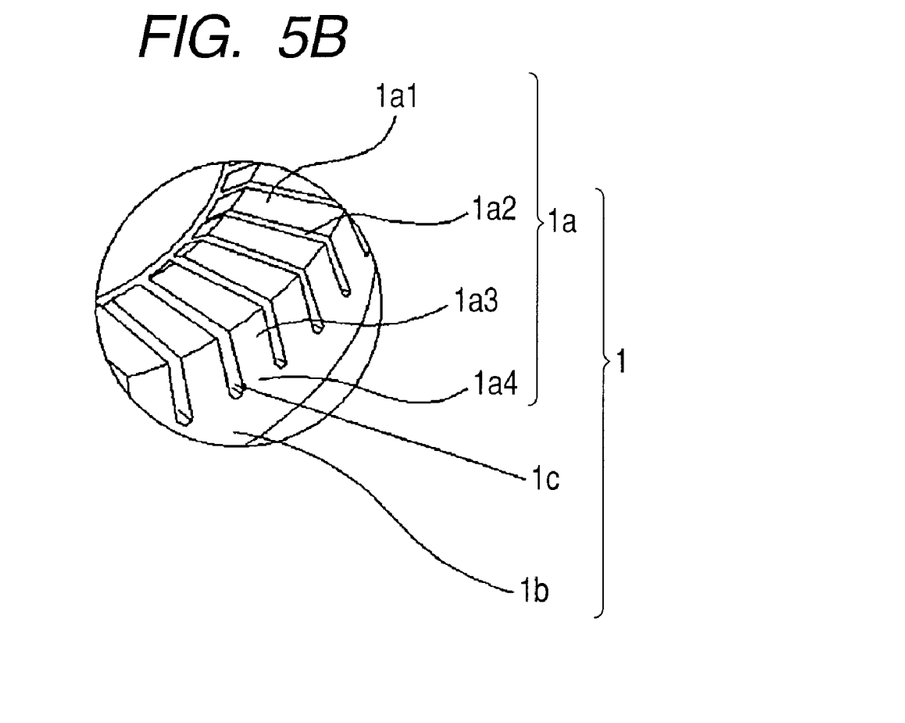
FIG. 5B is a perspective view illustrating a part of the vibrating body produced through the production method according to this embodiment.

FIG. 5B illustrates the vibrating body 1 produced according to this embodiment. The tapered amounts on the inner diameter side and the outer diameter side are adjusted to narrow the slits $1c$ between the respective protruding portions (slit widths in the peripheral direction), and equalize (parallelize) the slits. For example, in FIG. 4B, the slit widths of the inner diameter side in the peripheral direction are relatively expanded, and the inner diameter side is also tapered as described above to enable the entire slits $1c$ to be narrowed. In this way, in the vibration wave drive device using the movable body 1 in which the radial width of the frictional part is wide, that is, in the vibration wave drive device designed such that the frictional part is expanded inward, the lower surface pressure of the frictional surface can be achieved. Similarly, in this embodiment, the advantages obtained by the third embodiment can be made further remarkable.

Sixth Embodiment

Figure 6A:
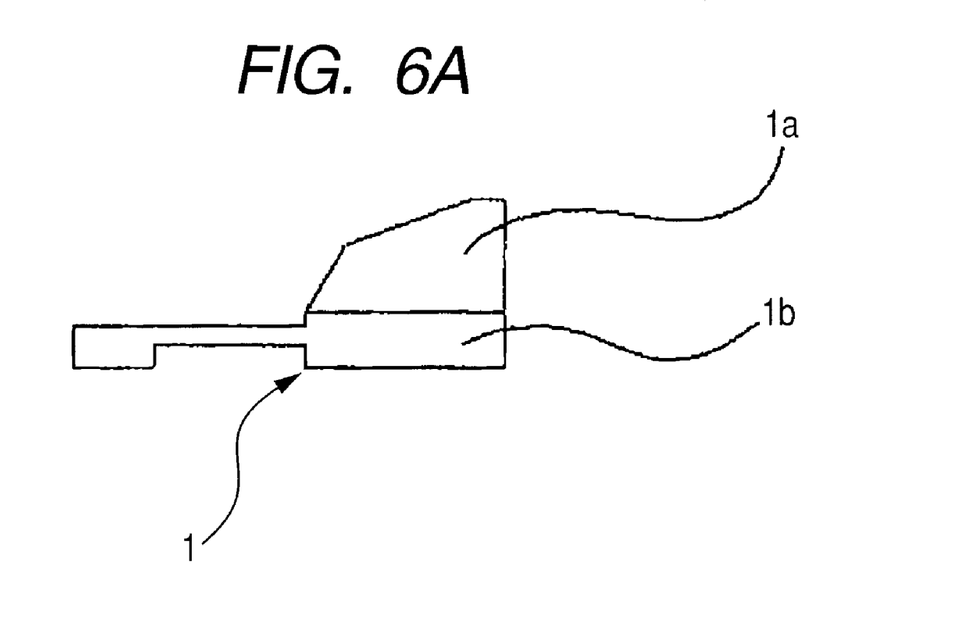
FIG. 6A is a diagram illustrating a part of an elastic material used in a production method according to a sixth embodiment.

A sixth embodiment is described with reference to FIGS. 6A and 6B. FIG. 6A is a diagram of the annular elastic material 1 with the protruding portions $1a$ viewed in a cross section including a central axis thereof (sectional view of a right half viewed in the peripheral direction). In the elastic material 1 according to this embodiment, there is provided a plane (oblique surfaces of the leading end surfaces of the protruding portions in FIG. 6A) nonparallel to a plane determined according to the leading ends of the protruding portions $1a$ (in other words, plane on which the elastic material 1 is stably put with the protruding portions $1a$ being disposed below). When the protruding portions $1a$ of the elastic material are pressed by the parallel planes as described in the first embodiment, the protruding portions $1a$ on the outer peripheral side (right side in FIG. 6A) are more pressed, and hence, after the protruding portions have been pressed, the vibrating body 1 in which the slit width on the outer peripheral side in the peripheral direction is narrower can be molded similarly as illustrated in FIG. 3C. The advantages are described above.

Figure 6B:
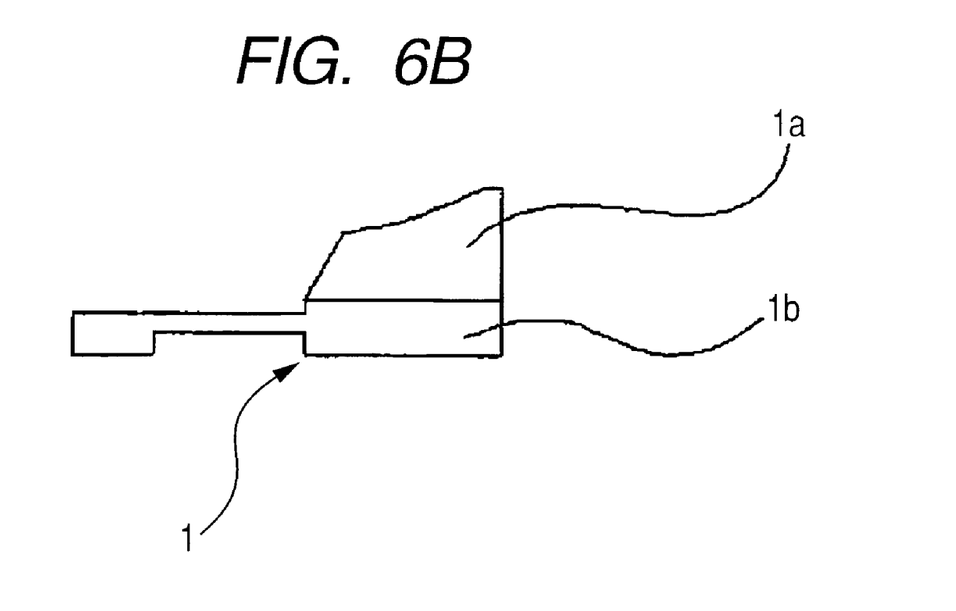
FIG. 6B is a diagram illustrating a part of another elastic material used in the production method according to this embodiment.

Also, as illustrated in FIG. 6B, the leading end surfaces of the protruding portions $1a$ may be not planar surfaces but curved surfaces. When the shape of the leading end surfaces is devised and the pressing manner and amount are adjusted, the above-mentioned ridge lines $1a2$ of the protruding portion leading end surfaces $1a1$ can be arbitrarily formed, and desired shape and width of the slits $1c$ are obtained.

Seventh Embodiment

Figure 7A:
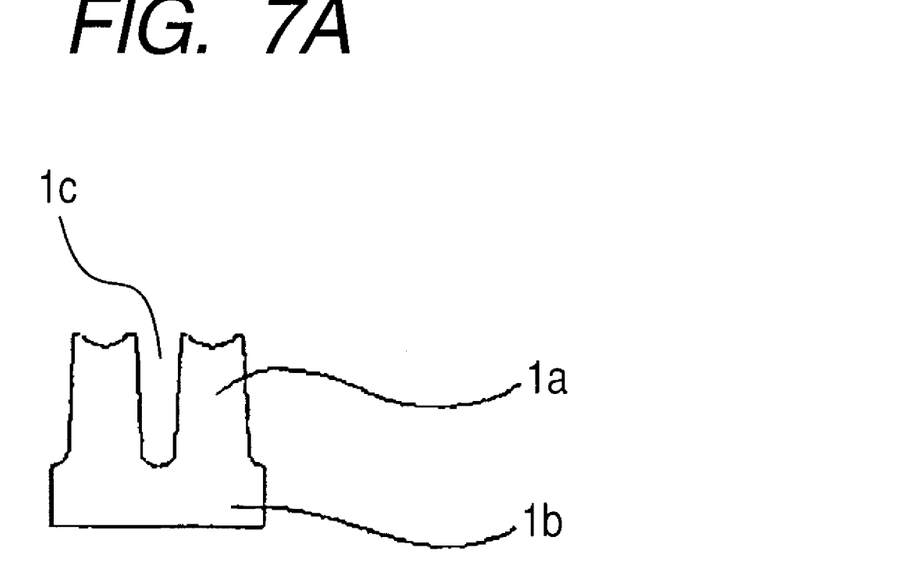
FIG. 7A is a diagram illustrating a part of an elastic material used in a seventh embodiment.
Figure 7B:
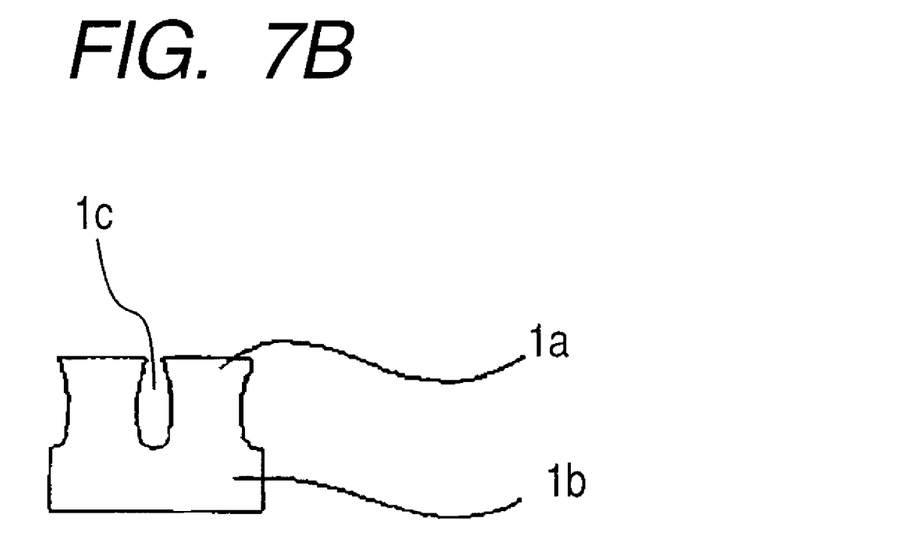
FIG. 7B is a diagram illustrating a part of a vibrating body produced in a production method according to this embodiment.

A seventh embodiment is described with reference to FIGS. 7A and 7B. FIG. 7A is a diagram of a part of the elastic material 1 viewed from the outer peripheral side toward the central direction (radial direction). The leading ends of the protruding portions (only two adjacent protruding portions as illustrated in FIGS. 7A and 7B) are projected on both sides thereof, and the central portions are recessed. When the protruding portions $1a$ of the elastic material are pressed, as illustrated in FIG. 7B, the widths of the slits $1c$ in the peripheral direction in the vicinity of the leading ends are narrower than those in the vicinity of the roots of the protruding portions $1a$. That is, the vicinities of the leading ends of the protruding portions $1a$ are projected toward the slit $1c$ side so as to be shaped in a canopy. This shape is factually difficult to be realized in other processing methods.

In the vibration wave drive device using the vibrating body according to this embodiment, rigidity of the portions of the ridge lines $1a2$ is deteriorated, and hence the vibrating body 1 smoothly comes in and out of contact with the frictional part of the movable body 4. This leads to a reduction in the rotation nonuniformity of the movable body 4 and a reduction in the noise as described above.

Eighth Embodiment

Figure 8A:
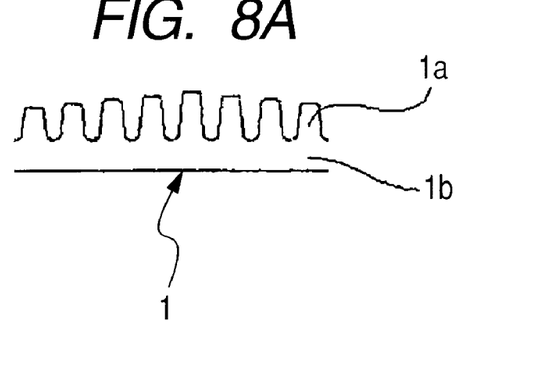
FIG. 8A is a diagram illustrating a part of an elastic material used in an eighth embodiment.
Figure 8B:
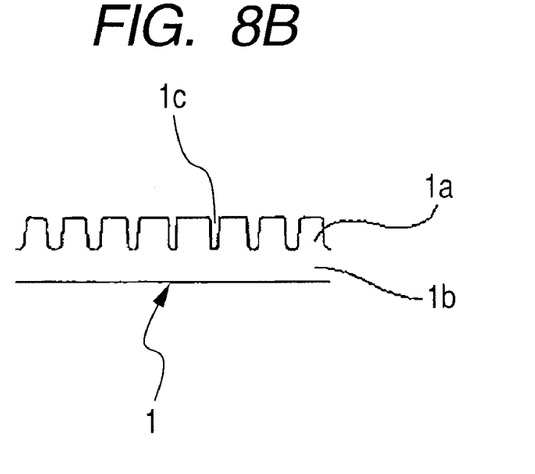
FIG. 8B is a diagram illustrating a part of a vibrating body produced in a production method according to this embodiment.
Figure 8C:
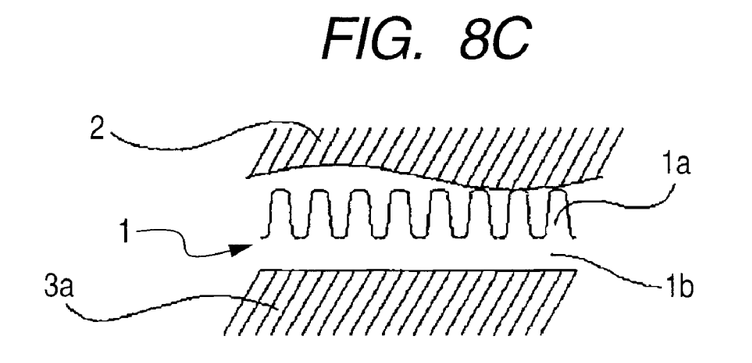
FIG. 8C is a diagram illustrating an example of a production method according to this embodiment.

An eighth embodiment is described with reference to FIGS. 8A to 8C. FIG. 8A is a diagram of a part of the annular elastic material 1 viewed from the outer peripheral side toward the central direction, and illustrates the protruding portions $1a$ different in height. When such elastic material is produced through a forge processing in advance, the vibrating body 1 different in the width of the slits $1c$ in the peripheral direction from each other as illustrated in FIG. 8B can be produced simply by using the production method of the present invention. When an attempt is made to produce the same vibrating body in other production methods, extremely complicated processing is forced, for example, several kinds of cutters different in thickness are prepared in advance, and the kinds of cutters are changed for each slit processing.

The vibrating body 1 illustrated in FIG. 8B can be produced in the following method. FIG. 8C illustrates a production process in which the elastic material 1 having the protruding portions $1a$ identical in height with each other is sandwiched between the punch 2 and the lower die $3a$ to press the protruding portions $1a$. In this case, waviness (angulation) is provided to the lower surface of the punch 2 in its peripheral direction, and the pressed amount is changed in each of the protruding portions. As a result, the vibrating body 1 which is different in the width of the slits $1c$ in the peripheral direction from each other can be produced similarly as described above. In this state, the height of the protruding portions $1a$ is not uniform, and hence the leading ends of the protruding portions are thereafter made uniform in height through a surface grinding process or a lapping process.

In the vibration wave drive device using the vibrating body according to this embodiment, the widths of the slits $1c$ of the vibrating body 1 are different from each other, and hence the following advantages are obtained. That is, the ridge lines 1*a*2 of the protruding portion leading end surfaces 1*a*1 contact with the frictional part of the movable body 4, and in this time, the movable body 4 is hit. However, hitting timing is not at regular intervals, and hence hit becomes smooth to reduce the rotation nonuniformity and reduce the noises. When the timing is at regular intervals, the vibrating force corresponding to the number of protruding portions (that is, integer times of the number of protruding portions) is applied to the movable body, and hence an undesirable phenomenon (generation of so-called "cry") may occur. However, in this embodiment, such phenomenon is reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-113922, filed May 8, 2009, which is hereby incorporated by reference herein in its entirety.

What is claimed is:

1. A method of producing a vibrating body for a vibration wave drive device using a vibrator in which an electromechanical energy conversion element is joined to a vibrating body comprising a plurality of protruding portions, the method comprising:

a first step of producing an elastic member formed of a metal and comprising the plurality of protruding portions; and a second step of applying a pressure in a direction opposite to a protruding direction of the protruding portions of the elastic member to press at least parts of the protruding portions to reduce dimensions of slits between adjacent protruding portions, wherein the dimensions of the slits between the adjacent protruding portions remain reduced even after the pressure is relieved.

2. The method of producing a vibrating body for a vibration wave drive device according to claim 1, wherein in the second step, side surfaces that form parts of the protruding portions of the elastic member and do not face the slits are held, and the pressure is applied in the direction opposite to the protruding direction of the protruding portions to press at least the parts of the protruding portions.

3. The method of producing a vibrating body for a vibration wave drive device according to claim 1 or 2, wherein the protruding portions are pressed such that ridge lines of a leading end surface of each of the protruding portions of the vibrating body, which face the slits, have curve shapes comprising portions each projected toward the slit side.

\* \* \* \* \*